United States Patent [19]

Aono

[11] 4,258,614
[45] Mar. 31, 1981

[54] CYLINDER DEVICE

[75] Inventor: Masami Aono, Yokohama, Japan

[73] Assignee: Tokico Ltd., Kawasaki, Japan

[21] Appl. No.: 24,038

[22] Filed: Mar. 26, 1979

[30] Foreign Application Priority Data

Mar. 29, 1978 [JP] Japan .............................. 53/37715[U]

[51] Int. Cl.³ .......................... F01B 11/02; F16J 9/08
[52] U.S. Cl. .................................... 92/85 R; 92/135;
 92/194; 92/240
[58] Field of Search ..................... 92/85 R, 85 A, 135,
 92/194, 240; 277/205, 212 C

[56] References Cited

U.S. PATENT DOCUMENTS

| 1,200,001 | 10/1916 | McClelland | 92/240 X |
| 1,431,355 | 10/1922 | Andrews | 92/85 A |
| 1,602,536 | 10/1926 | McElroy | 92/194 X |
| 2,059,729 | 11/1936 | Dick | 92/194 X |
| 2,424,225 | 7/1947 | Dick | 277/212 C |
| 2,571,538 | 10/1951 | Christensen | 92/194 X |
| 2,637,976 | 5/1953 | Myers et al. | 92/194 X |
| 2,865,695 | 12/1958 | Mazeika | 92/194 X |

FOREIGN PATENT DOCUMENTS 1013786 5/1952 France ................................. 277/212 C

*Primary Examiner*—Irwin C. Cohen
*Attorney, Agent, or Firm*—Wenderoth, Lind & Ponack

[57] ABSTRACT

A cylinder device has a main body having therein a cylinder having an inner closed end and an outer open end, a piston slidably fitted in the cylinder and having a small diameter portion on the inner end thereof, a liquid pressure chamber defined between the piston and the inner end of the cylinder, a cup seal fitted around the small diameter portion of the piston with a lip portion thereof directed toward the liquid pressure chamber and sealingly engaged with the cylinder, an annular retainer disposed in the liquid pressure chamber, a spring acting between the piston and the annular retainer to urge the retainer against the inner end of the cylinder, the configuration of the annular retainer being such that when the piston is at the innermost position in the cylinder the annular retainer engages the lip portion of the cup seal to prevent the lip portion from radially inward deflection.

4 Claims, 4 Drawing Figures

CYLINDER DEVICE

DETAILED DESCRIPTION OF THE INVENTION

This invention relates to a cylinder device such as an operating cylinder for changing-over a clutch or a wheel cylinder in a braking system or the like.

Typically, such a cylinder device comprises a main body having therein a cylinder having an inner closed end, and a piston slidably fitted in the cylinder with a liquid pressure chamber being defined between the inner end of the cylinder and the piston. By introducing liquid under pressure into the pressure chamber the piston is moved toward the open end of the cylinder. A cup seal is mounted on the piston with a lip portion thereof being directed toward the inner end of the cylinder so as to seal the piston from the cylinder.

When the cylinder device is incorporated in a hydraulic system, hydraulic fluid is, in some cases, supplied into the hydraulic system by, firstly, evacuating the interior of the system including the pressure chamber of the cylinder device and the pipe lines connected thereto and, thereafter, introducing hydraulic fluid into the system, whereby an air bleeding operation is avoided. However, when the interior of the pressure chamber is evacuated the lip portion of the cup seal usually deflects in the radially inward direction thereby destroying the seal between the piston and the cylinder, whereby a predetermined vacuum pressure cannot be established in the hydraulic system. Further, a dust cover mounted on the open end of the cylinder will sometimes be excessively deflected in the axially inward direction due to the vacuum pressure. For preventing these shortcomings, it has been proposed to form a diametrical step on the wall of the cylinder by forming a large diameter portion and a small diameter portion in the cylinder, or to form an annular groove in the wall of the cylinder for receiving a retaining ring therein, whereby the lip portion of the cup seal will engage with the diameterical step or the retaining ring when the pressure chamber is evacuated thus preventing the inward deflection of the lip portion, as shown in Japanese Utility Model Disclosure (Kokai-Koho) No. 160078/1977.

However, such prior art devices are defective since it requires an additional machining operation and is therefore expensive to form the diametrical step or to form the annular groove in the cylinder.

SUMMARY OF THE INVENTION

An object of the present invention is to overcome the shortcomings of the prior art devices by providing a cylinder device having a smooth surface over the entire area of the cylinder and preventing the inward deflection of the lip portion of the cup seal when the pressure chamber is evacuated. The cylinder device according to the present invention comprises a retainer disposed between the inner end of the cylinder and the cup seal, and a spring interposed between the retainer and the piston so as to urge the retainer against the inner end of the cylinder, the retainer being adapted to cooperate with the cup seal so as to prevent the lip portion of the cup seal from deflecting in the radially inward direction when the piston is at the innermost position in the cylinder.

BRIEF DESCRIPTION OF THE DRAWINGS

Other objects and features of the invention will become apparent from a consideration of the following description with reference to the drawings, wherein.

DESCRIPTION OF THE PREFERRED EMBODIMENT

Figure 1:
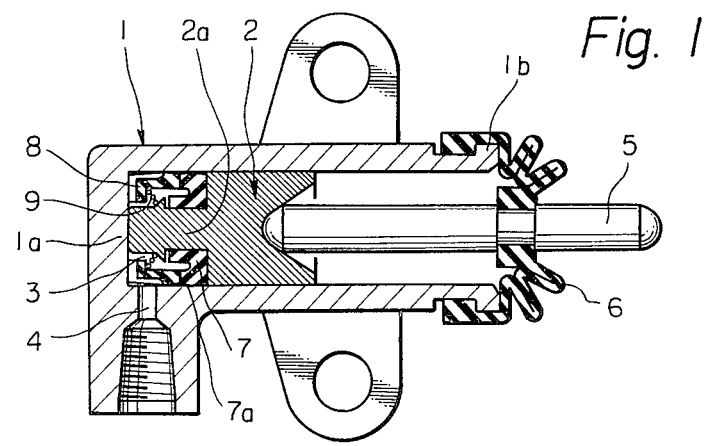
FIG. 1 is a longitudinal cross-section of the cylinder device according to the invention.

The cylinder device shown in the drawings comprises a main body 1 having therein a cylinder one end of which being is, a piston 2 slidably fitted in the cylinder to define between the piston 2 and the inner or closed end 1a of the cylinder a liquid pressure chamber 3. A hydraulic liquid supplying port 4 is formed adjacent to the inner end 1a for communicating with the pressure chamber 3. A push rod 5 extending out of the main body 1 engages with the piston 2 at the outer side thereof or the side adjacent to the open end 1b of the cylinder. A dust cover 6 covers the open end 1b of the main body with the opposite ends being respectively connected to the main body 1 and the push rod 5.

The piston 2 has a small diameter portion 2a extending toward the inner end 1a of the cylinder and the diameter of which is such as to assure a predetermined minimum volume of the pressure chamber 3 and to maintain the communication between the supplying port 4 and the pressure chamber 3 when the small diameter portion 2a abuts the inner end 1a of the cylinder or when the piston 2 is at the innermost position. A cup seal 7 with a lip portion 7a directed toward the pressure chamber 3 is mounted on the small diameter portion 2a of the piston 2, and when liquid under pressure is supplied into the pressure chamber 3 through the port 4, the lip portion 7a is urged to expand in the radially outward direction to tightly engage with the cylindrical wall of the cylinder 1 thereby preventing the leakage of liquid through the clearance between the piston 2 and the cylinder. Incidentally, the cup seal 7 is retained in position on the small diameter portion 2a by the large diameter portion 2b of the piston 2 and an annular projection 2c formed on the small diameter portion 2a of the piston 2.

Figure 2:
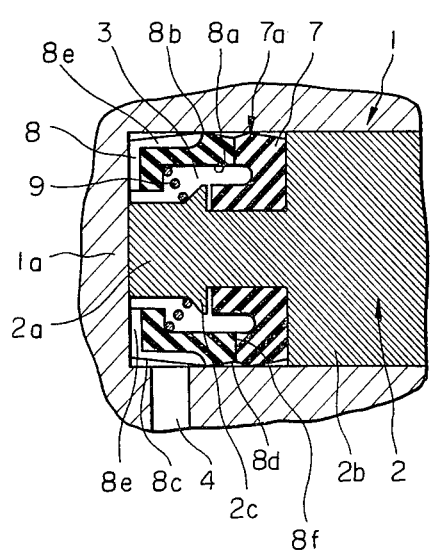
FIG. 2 is an enlarged sectional view showing the essential portion of FIG. 1.
Figure 3:
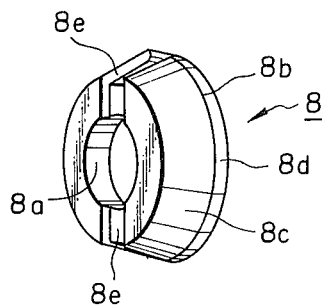
FIG. 3 is a perspective view of the retainer shown in FIGS. 1 and 2.

An annular retainer 8 is disposed in the pressure chamber 3 and between the inner end 1a of the main body 1 and the cup seal 7 as shown clearly in FIG. 2. The retainer 8 is slidable in the cylinder and has a bore 8a adapted to loosely receive the small diameter portion 2a therethrough of the piston 2. A coil spring 9 is disposed between the retainer 8 and the annular projection 2c of the piston 2 to normally urge the retainer 8 against the inner end 1a of the cylinder.

The retainer 8 is formed of a resilient material such as rubber or of a synthetic resin material such as polyacetal, polypropylene, polyethylene, nylon or the like, and acts to engage with the lip portion 7a of the cup seal 7 so as to expand it or to urge it in the radially outward direction when the piston 2 is in the innermost position in the cylinder, and the details of which will be explained hereinafter. The retainer 8 has the outer configuration with a maximum diameter portion 8b located toward the cup seal 7 relative to the supply port 4, and tapered portions 8c and 8d extending respectively inwardly and outwardly from the maximum diameter portion 8b to reduce the diameters thereof, and grooves 8e and 8e are formed in the tapered portion 8c extending to and across the inner end surface portion and communicating with the bore 8a. The thickness or the length in the axial or the transverse direction as viewed in FIG. 2 of the retainer 8 is such that when the piston 2 is in the innermost position in the cylinder the right end surface 8f, i.e. the outer end surface of the retainer 8 engages with the lip portion 7a of the cup seal 7. Preferably, the end surface 8f has a conical or convex shape so as to urge the lip portion 7a in the radially outward direction by the engagement therewith. The bore 8a in the retainer 8 has a stepped configuration and the diametrical step therein is engaged by one end of the coil spring 9 as shown in FIG. 2.

The cylinder device can easily be assembled by inserting the retainer 8 into the cylinder from the open or outer end 1b thereof, inserting a sub-assembly of the piston 2, the cup seal 7 and the coil spring 9, and assembling the push rod 5 and the dust cover 6 with the cylinder.

After connecting hydraulic liquid supplying pipe line to the supplying port 4, the interior of the pipe line and the pressure chamber 3 are evacuated. By this action the piston 2 is pulled toward the inner end 1a of the cylinder and arrives at the innermost position as shown in FIGS. 1 and 2. The lip portion 7a of the cup seal 7 tends to deflect radially inward because of the vacuum in the pressure chamber 3; however, the retainer 8 engages, as described heretofore, with the lip portion 7a to prevent the radially inward deflection and instead to urge it in the radially outward direction thus reliably maintaining the sealing characteristics of the cup seal 7. Further, the retainer 8 may be formed of a soft or resilient material and the diameter of the large diameter portion 8b and the axial length of the retainer 8 may be made such that when the retainer 8 tightly engages with the lip portion 7a of the cup seal 7 the retainer 8 expands to increase the diameter thereof thereby, urging the large diameter portion 8b tightly against the wall of the cylinder and thus enhancing the sealing characteristics of the retainer 8 and the cup seal 7.

After evacuating the interior of the pipe line and the pressure chamber 3 hydraulic fluid is supplied thereto. Substantially no air will remain in the hydraulic system and, thus, the cylinder device can be reliably operated by supplying hydraulic fluid under pressure into the pressure chamber 3. At that time, the piston 2 moves in the rightward direction in FIG. 2 to rightwardly displace the piston 5, thereby actuating the clutch, brake or the like. When pressure in the cylinder is released the piston 2 returns to its original position. Since the retainer 8 is maintained in engagement with the inner end 1a of the cylinder by the coil spring 9, the retainer 8 is prevented from making any arbitrary movement, thus, it is prevented from making any knocking sounds or causing incidental failure.

The supply port 4 and the left end portion of the retainer 8 are communicated with the outer circumference 8c, the grooves 8e and 8e and the bore 8a.

Figure 4:
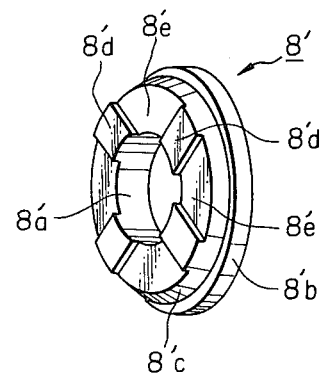
FIG. 4 is a perspective view of a modified form of retainer.

FIG. 4 shows a modified form of the retainer. The retainer 8' has a large diameter portion 8'b received in the cylinder with a small clearance and a generally cylindrical small diameter portion 8'c on the side adjacent to the inner end 1a of the cylinder. Further, there is formed a plurality of radially extending grooves 8'e in the end surface abutting the inner end 1a of the cylinder, and a bore 8'a similar to that of the first embodiment. Since the thickness or the axial length of the large diameter portion 8'b is greater than that of the retainer 8, the sealing characteristics can be improved.

In the embodiments described above, the piston 2 engages the inner end 1a of the cylinder when the piston is at the innermost position. However, the piston 2 need not necessarily abut the inner end 1a of the cylinder and the axial force acting between the cup seal 7 and the retainer 8 can be adjusted by adjusting a stop (not shown) restricting the inward movement of the piston 2.

As described heretofore, the cylinder device according to the present invention can effectively prevent the lip portion of the cup seal from radially inward deflection, when the pressure chamber is evacuated, by utilizing an annular retainer which is normally retained by a spring to abut the inner end of the cylinder, thus avoiding the need for any additional machining operation such as machining an annular groove or a diametrical step which have been used in prior art cylinder devices.

What is claimed is:

1. A cylinder device comprising a main body having therein a cylinder having a closed inner end, a piston slidably fitted in the cylinder and having a small diameter portion on the inner end thereof, a cup seal fitted on the outer circumference of the small diameter portion of the piston and having a lip portion slidably engaging with the inner circumferential surface of the cylinder, an annular retainer mounted on and in the inner end of the cylinder and having a cylindrical portion extending toward the outer end of the cylinder with an end surface for engaging with the lip portion of the cup seal when the piston is at the innermost position in the cylinder for urging the lip portion of the cup seal radially outwardly against the inner circumferential surface of the cylinder, and a spring between said retainer for urging the retainer against the inner end of the cylinder and maintaining the retainer immobile in the inner end of the cylinder during the stroke of the piston.

2. A cylinder device as set forth in claim 1, wherein the retainer is formed of a resilient material.

3. A cylinder device as set forth in claim 1, wherein the retainer has a large diameter portion fitted in the cylinder, and a plurality of grooves therein acting as oil passages.

4. A cylinder device as set forth in claim 1, wherein said retainer has a radially inwardly extending flange which is engaged by said spring.

* * * * *

UNITED STATES PATENT AND TRADEMARK OFFICE
CERTIFICATE OF CORRECTION

PATENT NO. : 4,258,614
DATED : March 31, 1981
INVENTOR(S) : MASAMI AONO

It is certified that error appears in the above-identified patent and that said Letters Patent are hereby corrected as shown below:

In the heading line [30] Foreign application priority data, for "March 29, 1978", read --March 24, 1978--.

Signed and Sealed this

First Day of December 1981

[SEAL]

Attest:

Attesting Officer

GERALD J. MOSSINGHOFF

Commissioner of Patents and Trademarks